(12) United States Patent
Lee et al.

(10) Patent No.: US 9,048,712 B2
(45) Date of Patent: Jun. 2, 2015

(54) MOTOR AND ROTOR THEREOF

(71) Applicant: Samsung Electronics Co., Ltd., Suwon-si, Gyeonggi-do (KR)

(72) Inventors: Jae Young Lee, Daegu (KR); Deok Jin Kim, Hwaseong-si (KR); Young Kwan Kim, Anyang-si (KR); Young Gyu An, Cheongju-si (KR); Byung Ryel In, Yongin-si (KR); Jin Woo Han, Suwon-si (KW)

(73) Assignee: SAMSUNG ELECTRONICS CO., LTD., Suwon-Si (KR)

(*) Notice: Subject to any disclaimer, the term of this patent is extended or adjusted under 35 U.S.C. 154(b) by 325 days.

(21) Appl. No.: 13/742,583

(22) Filed: Jan. 16, 2013

(65) Prior Publication Data

US 2013/0187486 A1 Jul. 25, 2013

(30) Foreign Application Priority Data

Jan. 19, 2012 (KR) ........................ 10-2012-0006424

(51) Int. Cl.
| | | |
|---|---|---|
| *H02K 1/04* | (2006.01) | |
| *H02K 1/28* | (2006.01) | |
| *H02K 1/27* | (2006.01) | |
| *H02K 5/02* | (2006.01) | |

(52) U.S. Cl.
CPC .................. *H02K 1/28* (2013.01); *H02K 1/278* (2013.01); *H02K 5/02* (2013.01)

(58) Field of Classification Search
USPC .............................. 310/43, 216.133, 216.114, 310/156.18–156.19, 156.21, 156.23, 310/214–215
See application file for complete search history.

(56) References Cited

U.S. PATENT DOCUMENTS

| 5,200,662 | A | * | 4/1993 | Tagami et al. ........... 310/156.61 |
| 5,378,953 | A | * | 1/1995 | Uchida et al. ............ 310/156.59 |
| 5,828,152 | A | * | 10/1998 | Takeda et al. ............ 310/156.19 |
| 2007/0252469 | A1 | * | 11/2007 | Nishiura et al. ......... 310/156.56 |
| 2009/0096308 | A1 | * | 4/2009 | Staudenmann ......... 310/156.08 |
| 2009/0230803 | A1 | * | 9/2009 | Nakayama et al. ...... 310/156.56 |
| 2010/0060223 | A1 | * | 3/2010 | Sakai et al. .................... 318/494 |
| 2013/0187506 | A1 | * | 7/2013 | Lee et al. .................. 310/156.12 |

\* cited by examiner

*Primary Examiner* — Thanh Lam
(74) *Attorney, Agent, or Firm* — Staas & Halsey LLP

(57) ABSTRACT

A rotor having an improved structure capable of achieving an enhancement in durability and a motor having the rotor are disclosed. The rotor is configured to co-operate with a stator in an electromagnetic manner such that the rotor rotates. The rotor includes a sleeve having a shaft hole, through which the motor shaft extends, rotor cores spaced apart from one another in a circumferential direction of the rotor, and at least one of permanent magnets disposed between adjacent ones of the rotor cores such that the permanent magnets are arranged in a radial manner about the sleeve. First and second cover plates are disposed at opposite sides of the permanent magnets in an axial direction. The first and second cover plates have plate holes respectively corresponding to the through holes of the rotor cores. The rotor cores and the first and second cover plates are coupled by fastening members.

26 Claims, 14 Drawing Sheets

MOTOR AND ROTOR THEREOF

CROSS-REFERENCE TO RELATED APPLICATIONS

This application claims the priority benefit of Korean Patent Application No. 10-2012-0006424, filed on Jan. 19, 2012 in the Korean Intellectual Property Office, the disclosure of which is incorporated herein by reference.

BACKGROUND

1. Field

The following description relates to a motor having an improved structure capable of achieving an enhancement in durability.

2. Description of the Related Art

A motor is a machine to obtain rotating force from electrical energy. Such a motor includes a stator and a rotor. The rotor is configured to co-operate with the stator in an electromagnetic manner. The rotor is rotated by a force exerted between a magnetic filed and current flowing through a coil.

Permanent magnet motors, which use permanent magnets to generate an electric field, may be classified into a surface mounted permanent magnet motor, an interior type permanent magnet motor, and a spoke type permanent magnet motor.

The spoke type permanent magnet motor may generate high power with high torque in that it exhibits high magnetic flux concentration. The spoke type permanent magnet motor may also be advantageous in that it may be miniaturized, as compared to other types of motors, for the same output power. The spoke type permanent magnet motor may be applied to drive motors for washing machines or electric vehicles, which require high power with high torque.

Generally, the rotor of the spoke type permanent magnet motor includes permanent magnets arranged about a rotating shaft in a radial manner, and a body to support the permanent magnets while defining passages for magnetic flux. The body may include cores each arranged between adjacent ones of the permanent magnets, and cylindrical supports each arranged between the rotating shaft and a corresponding one of the permanent magnets while being connected to a corresponding one of the cores.

In such a spoke type permanent magnet motor, the cores of the rotor may be deformed or damaged due to centrifugal force generated during high-speed rotation of the rotor because the body of the rotor is weak in terms of structure.

Furthermore, in the spoke type permanent magnet motor, magnetic flux may partially leak toward the rotating shaft through the cylindrical supports of the rotor body. When leakage of magnetic flux increases, the use rate of the permanent magnets may be increased, as compared to other types of motors, for the same motor power. In this case, accordingly, there may be disadvantages in terms of material costs and motor miniaturization.

SUMMARY

Therefore, it is an aspect of the present disclosure to provide a rotor having an improved structure capable of achieving an enhancement in durability, and a motor including the same.

It is another aspect of the present disclosure to provide a rotor having an improved structure capable of achieving a reduction in magnetic flux leakage, and a motor including the same.

Additional aspects of the disclosure will be set forth in part in the description which follows and, in part, will be apparent from the description, or may be learned by practice of the disclosure.

In accordance with an aspect of the present disclosure, a motor includes a stator comprising stator cores and coils wound around the stator cores, a rotor to co-operate with the stator in an electromagnetic manner such that the rotor rotates, and a motor shaft coupled to the rotor, to rotate along with the rotor, wherein the rotor includes a sleeve having a shaft hole, through which the motor shaft extends, a plurality of rotor cores arranged to be spaced apart from one another in a circumferential direction of the rotor, at least one of the rotor cores having a through hole, at least one of permanent magnets disposed between adjacent ones of the rotor cores such that the permanent magnets are arranged in a radial manner about the sleeve, first and second cover plates disposed at opposite sides of the permanent magnets in an axial direction, the first and second cover plates having plate holes respectively corresponding to the through holes of the rotor cores, and at least one of fastening members coupled to a corresponding one of the rotor cores and the first and second cover plates, at least one of the fastening members comprising a body inserted into the through hole of the corresponding rotor core, and a first head provided at a leading end of the body in an insertion direction of the body into the rotor core, the first head being supported by an outer surface of the first cover plate after passing through a corresponding one of the plate holes of the first cover plate when the fastening member is coupled to the rotor.

The first head of the fastening member may have a cross-sectional size greater than a size of the plate hole of the first cover plate such that the first head forcibly passes through the plate hole of the first cover plate.

The first head of the fastening member may have a cross-sectional size smaller than a size of the through hole of the rotor core such that the first head smoothly passes through the through hole of the rotor core.

The body of the fastening member may have a cross-sectional size smaller than a size of the through hole of the rotor core such that the body smoothly passes through the through hole of the rotor core.

The cross-sectional size of the body of the fastening member may be greater than a size of the plate hole of the first cover plate such that the body is prevented from passing through the plate hole of the first cover plate.

The fastening member may further include a neck provided between the first head and the body, to be received in the plate hole of the first cover plate.

The plate hole of the second cover plate may have a size greater than a cross-sectional size of the first head of the fastening member and a cross-sectional size of the body of the fastening member such that the first head and the body pass through the plate hole of the second cover plate when the body is inserted into the rotor core.

The fastening member may further include a second head provided at a trailing end of the body in the insertion direction of the body into the rotor core, and supported by an outer surface of the second cover plate.

The first head may have a guide surface formed to have a cross-sectional size gradually increasing in a direction from a leading end of the first head to a trailing end of the first head.

The fastening member may further include a slit formed in a longitudinal direction of the fastening member such that the first head is deformed when the first head passes through the plate hole of the first cover plate, to reduce a cross-sectional size of the first head.

The first head, the body and the second head of the fastening member may be integrated to form a single member.

The rotor may further include an injection-molded plastic member to cover outsides of the first and second cover plates.

The rotor may further include an injection-molded plastic member to cover outer ends of the permanent magnets in a radial direction of the rotor.

The outer end of at least one of the permanent magnets may be disposed more inwardly in the radial direction than outer surfaces of the rotor cores disposed adjacent to each other in the circumferential direction of the rotor at opposite sides of the permanent magnet. The rotor may further include a plastic receiving space defined by the adjacent rotor cores and the outer end of the permanent magnet disposed between the adjacent rotor cores.

At least one of the rotor cores may include a first protrusion extending to support the outer end of the permanent magnet disposed adjacent to the rotor cores, and a second protrusion extending toward the plastic receiving space, to define a groove between the first protrusion and the second protrusion.

The second protrusion may have an inclined portion inclinedly extending from the first protrusion such that the plastic receiving portion has a width in the circumferential direction of the rotor such that the width is gradually reduced as the plastic receiving portion outwardly extends in the radial direction of the rotor.

The inclined portion of the second protrusion may form an angle ranging approximately from 40° to about 70° with respect to the first protrusion.

The second protrusion may be disposed outside the first protrusion in the radial direction of the rotor while being spaced apart from the first protrusion such that the groove is arranged between the first protrusion and the second protrusion.

In accordance with another aspect of the present disclosure, a rotor of a motor, the rotor being disposed within a stator of the motor, includes a sleeve formed with a shaft hole to be coupled with a motor shaft, a plurality of rotor cores arranged to be spaced apart from one another in a circumferential direction of the rotor, to define a plurality of rotor slots, one or more of the rotor cores having through holes, respectively, a plurality of bridges arranged to connect the rotor cores to the sleeve, respectively, a plurality of permanent magnets respectively inserted into the rotor slots such that at least one of the permanent magnets has an inner end spaced apart from the sleeve, a plurality of inner support protrusions extending from the sleeve toward the rotor slots, to support the inner ends of the permanent magnets, respectively, a plurality of outer support protrusions extending from the rotor cores, to support the outer ends of the permanent magnets, respectively, an injection-molded plastic member filling the rotor slots, to cover the outer ends of the permanent magnets, a plurality of fixing grooves provided at the rotor cores, respectively, to receive the injection-molded plastic member, and a plurality of fixing protrusions arranged outside the fixing grooves in a radial direction of the rotor, respectively, to prevent the injection-molded plastic member from being separated from the rotor by centrifugal force during rotation of the rotor.

At least one of the fixing protrusions may inclinedly extend from a corresponding one of the outer support protrusions such that the injection-molded plastic member has a width extending in the radial direction of the rotor while being gradually reduced as the injection-molded plastic member outwardly extends in the radial direction of the rotor.

At least one of the fixing protrusions may be spaced apart from a corresponding one of the outer support protrusions such that a corresponding one of the fixing grooves is arranged between the fixing protrusion and the outer support protrusion.

The rotor may further include first and second cover plates disposed at opposite sides of the permanent magnets in an axial direction, he first and second cover plates having plate holes respectively corresponding to the through holes of the rotor cores, and at least one of fastening members coupled to a corresponding one of the rotor cores and the first and second cover plates, at least one of the fastening members including a body inserted into the through hole of the corresponding rotor core, and a head provided at a leading end of the body in an insertion direction of the body into the rotor core, the head being supported by an outer surface of the first cover plate after passing through a corresponding one of the plate holes of the first cover plate when the fastening member is coupled to the rotor.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Hereinafter, embodiments of the present disclosure will be described with reference to the accompanying drawings. In the following description, "axial direction X" means a direction parallel to a motor shaft. "Circumferential direction C" and "radial direction R" mean a direction extending along the circumference of a circle and a direction extending along the radius of the circle, respectively.

Figure 1:
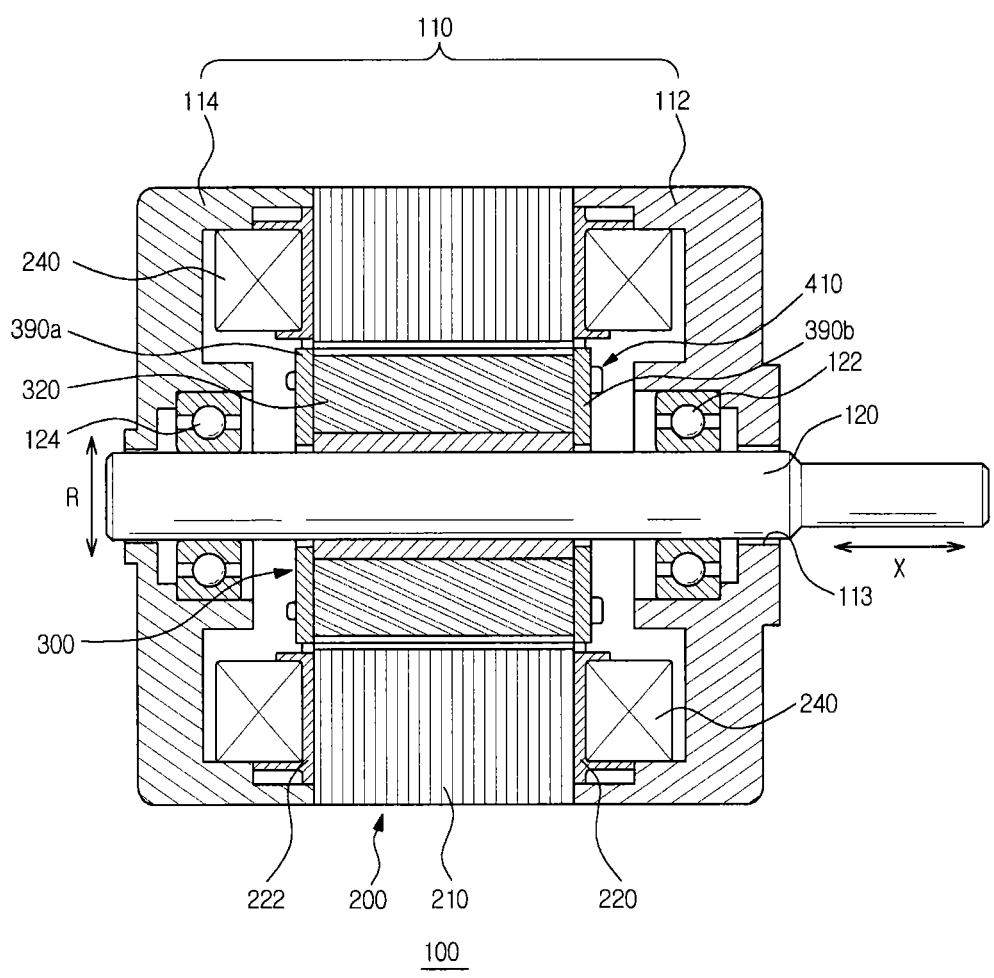
FIG. 1 is a sectional view illustrating a configuration of a motor according to an embodiment of the present disclosure.

Referring to FIG. 1, a motor 100 is illustrated. The motor 100 includes a motor housing 110 to form an outer appearance of the motor 100. The motor housing 110 may include a first housing 112 and a second housing 114, which are separated from each other in an axial direction of the motor 100. The first housing 112 and second housing 114 may be fastened to a stator 200.

The stator 200 is disposed within the motor housing 110, along with a rotor 300. The stator 200 may be fixed to the motor housing 110. The rotor 300 is configured to co-operate with the stator 200 in an electromagnetic manner such that it rotates. The rotor 300 may be disposed within the stator 200.

A motor shaft 120 is inserted into the rotor 300 such that it rotates along with the rotor 300. The motor shaft 120 is rotatably supported, at one side thereof, by the first housing 112 via a bearing 122. The motor shaft 120 is rotatably supported, at the other side thereof, by the second housing 114 via a bearing 124. One end of the motor shaft 120 protrudes outwardly of the motor housing 110 through an opening 113 formed at the first housing 112.

Figure 2:
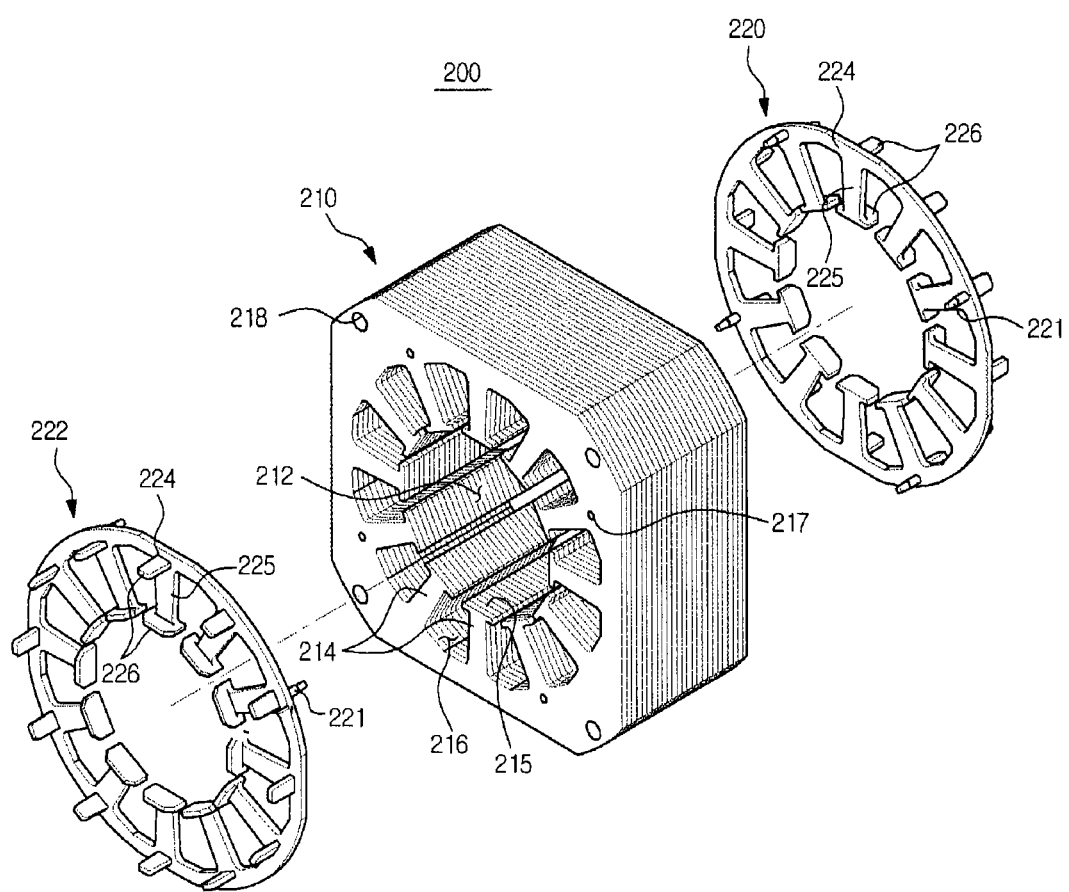
FIG. 2 is a perspective view illustrating a stator included in an illustrated embodiment of the present disclosure.
Figure 5:
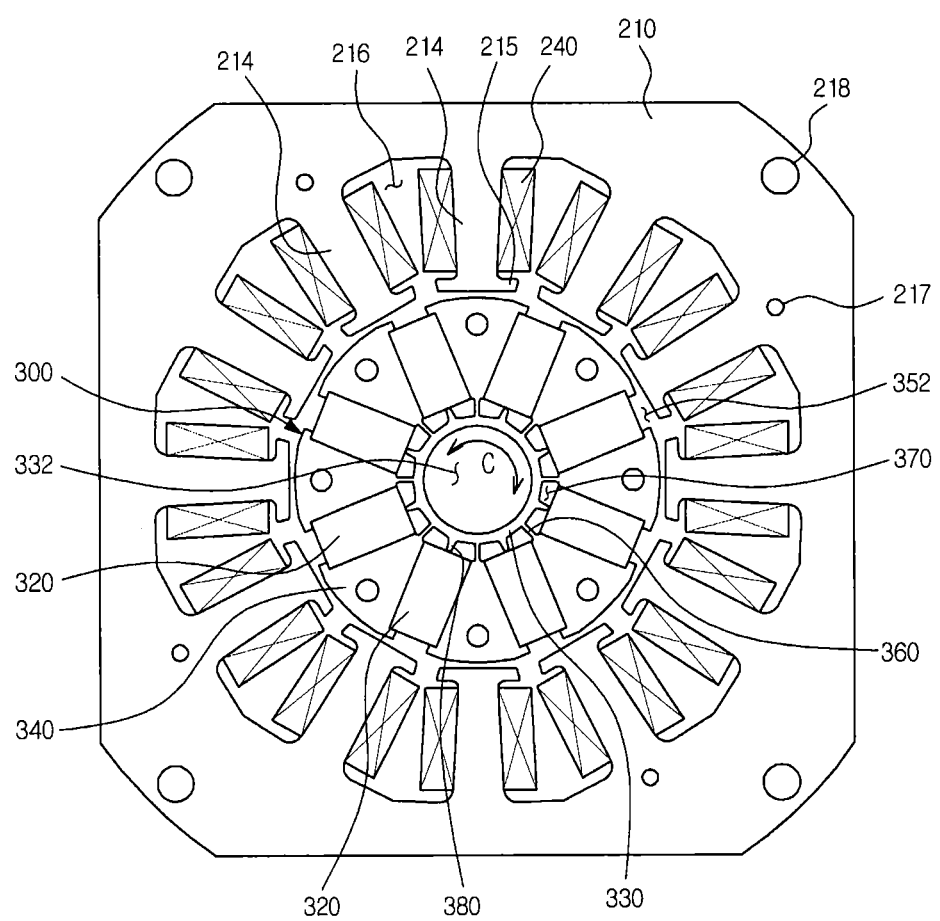
FIG. 5 is a view illustrating the configurations of the stator and rotor in the motor according to an illustrated embodiment of the present disclosure in a state in which the configurations are partially eliminated.

As shown in FIGS. 1, 2, and 5, the stator 200 may include a stator body 210, a first insulator 220, a second insulator 222, and coils 240. The coils 240 are not shown in FIG. 2.

A space is formed at a central portion of the stator body 210, to receive the rotor 300. Stator cores 214 are arranged around a rotor receiving portion 212 in a circumferential direction (direction C in FIG. 5) of the rotor 300. The stator cores 214 extend in a radial direction from the rotor receiving portion 212. The stator body 210 may be formed by stacking pressed iron plates.

As the stator cores 214 are spaced apart from one another in the circumferential direction, stator slots 216 are formed such that at least one of stator slots 216 is arranged between the adjacent stator cores 214. The coils 240 are wound around the stator cores 214, respectively, such that they are received in the stator slots 216. At least one stator core 214 is formed with an extension core portion 215 at an inner end thereof adjacent to the rotor 300. The extension core portion 215 has an increased width. A clearance is defined between an inner surface of at least one extension core portion 215 and an outer surface of the rotor 300, for rotation of the rotor 300.

The first insulator 220 and second insulator 222 are made of a material having an electrical insulation property. The first insulator 220 and second insulator 222 are arranged at opposite sides of the stator body 210 in the axial direction. The first insulator 220 and second insulator 222 are coupled to opposite sides of the stator body 210, respectively, to cover the stator core 214. At least one of the first insulator 220 and second insulator 222 is formed with coupling protrusions 221 extending toward the stator body 210. The coupling protrusions 221 are fitted into coupling holes 217 formed at the stator body 210.

At least one of the first insulator 220 and second insulator 222 includes an annular rim 224, coil supports 225 arranged to correspond to respective stator cores 214, and coil guides 226 respectively protruded from radial inner and outer ends of at least one coil support 225. The coil supports 225 are spaced apart from one another in the circumferential direction such that a space corresponding to at least one stator slot 216 is defined between the adjacent coil supports 225.

The coils 240 are wound around the stator core 214 and the coil supports 225 of the first and second insulators 220 and 222 in a state in which the first and second insulators 220 and 222 are coupled to the stator body 210.

Fastening holes 218 may be formed to axially extend through the stator body 210. Fastening members (not shown) such as pins or rivets may be fastened to the fastening holes 218 in order to couple plates constituting the stator body 210.

Through holes (not shown) are formed through the first and second housings 112 and 114, to correspond to the fastening holes 218 of the stator body 210. Thus, the first housing 112, second housing 114, and stator 200 may be fastened by the single fastening members.

As shown in FIGS. 3 to 6, the rotor 300 includes a rotor body 310 arranged in the rotor receiving portion 212 of the stator body 210, and permanent magnets 320 inserted into the rotor body 310. The rotor body 310 may be formed by stacking plate members, which are prepared by pressing a silicon steel plate.

In order to reinforce the structural rigidity of the rotor 300, a first cover plate 390a and a second cover plate 390b may be disposed at opposite sides of the rotor body 310 in the axial direction (direction X), respectively. A shaft hole 392 may be centrally formed through the first and second cover plates 390a and 390b, to receive the motor shaft 120.

The first and second cover plates 390a and 390b are arranged to cover outsides of the permanent magnets 320 in the axial direction. Thus, the first and second cover plates 390a and 390b prevent the permanent magnets 320 from being separated from the rotor 300 in the axial direction. The first and second cover plates 390a and 390b may also be used as a structure to balance the rotor 300 when the rotor 300 is in an unbalanced state. The first and second cover plates 390a and 390b may be made of a non-magnetic material, for example, copper or stainless steel.

The first and second cover plates 390a and 390b may be covered in the axial direction by a plastic member 400. The structural strength of the rotor 300 may be enhanced by the plastic member 400. The plastic member 400 may be integrated with the rotor 300 by inserting the rotor body 310 into a mold (not shown) in a state in which the first and second cover plates 390a and 390b are coupled to the rotor body 310, and performing an injection molding process for the mold using a plastic material. The plastic member 400 may be formed to cover the outsides of the permanent magnets 320 in the radial direction of the rotor 300.

Figure 4:
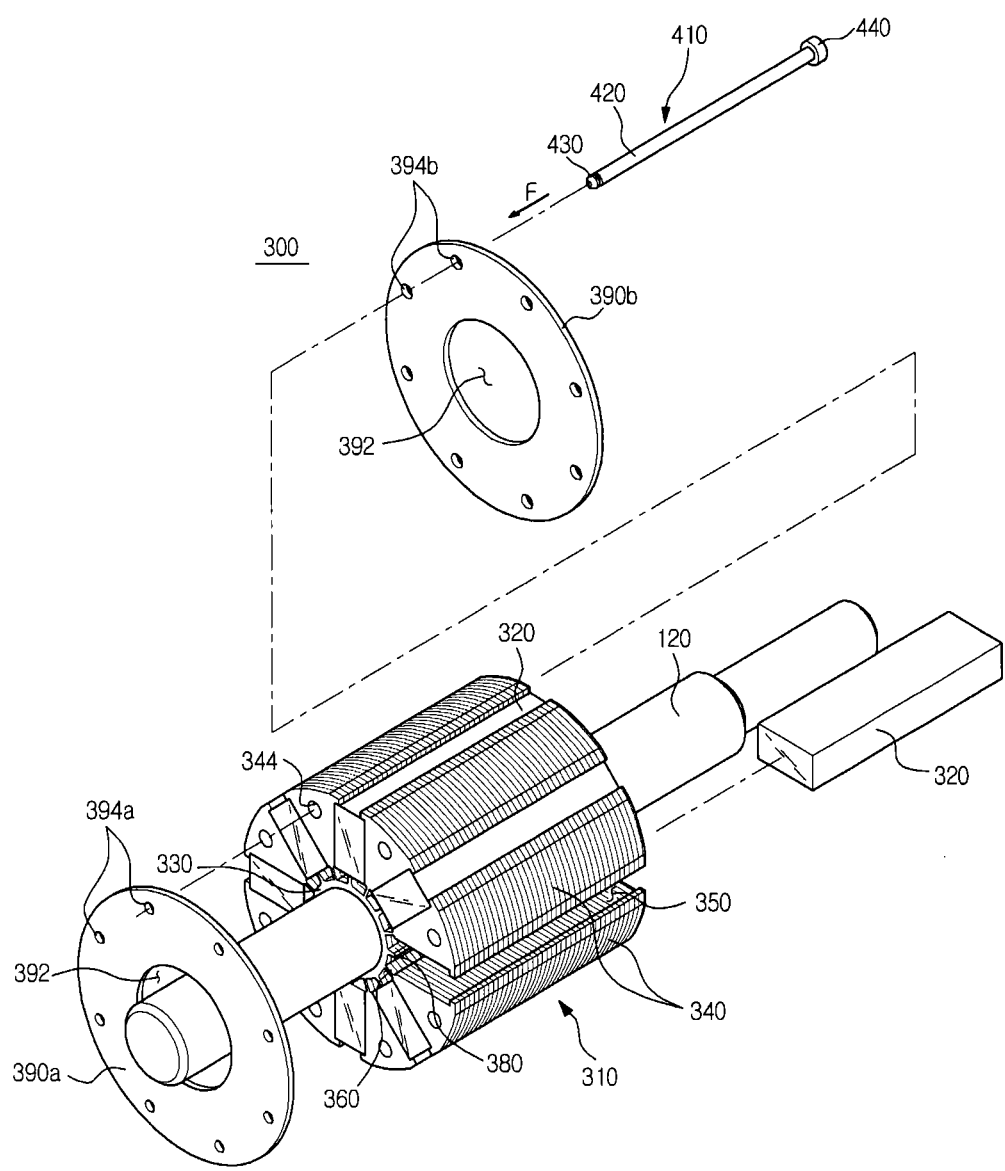
FIG. 4 is an exploded perspective view illustrating the rotor according to an illustrated embodiment of the present disclosure.

The permanent magnets 320 are arranged in the circumferential direction of the rotor 300 such that they are disposed around the motor shaft 120 in a radial manner. FIG. 4 illustrates an example in which eight permanent magnets are arranged. However, the number of permanent magnets may be varied. The permanent magnets may be ferrite magnets or magnets containing a rare earth material such as neodymium or samarium.

At least one permanent magnet 320 has an inner end 321 disposed adjacent to the motor shaft 120 in the radial direction of the rotor 300. At least one permanent magnet 320 also has an outer end 322 disposed adjacent to the stator 200. The inner end 321 and outer end 322 of at least one permanent magnet 320 have shorter sides 333 and 334 extending in the circumferential direction of the rotor 300, and longer sides 335 and 336 extending in the radial direction of the rotor 300. In at least one permanent magnet 320, the shorter sides 333 and 334 are connected to the longer sides 335 and 336. The longer sides 335 and 336 have a longer length than the shorter sides 333 and 334.

At least one permanent magnet 320 has N and S poles arranged in the circumferential direction of the rotor 300. Adjacent ones of the permanent magnets 320, namely, a first permanent magnet 320a and a second permanent magnet 320b, are arranged such that the same poles thereof face each other. In accordance with a magnetic circuit established by the above-described magnet arrangement, it may concentrate magnetic flux generated from the permanent magnets, and thus to achieve an enhancement in performance while reducing motor size.

The rotor body 310 includes a sleeve 330 formed with a shaft hole 332, in which the motor shaft 120 is fitted, and rotor cores 340 connected to the sleeve 330.

The sleeve 330 has an annular structure. The sleeve 330 has an inner circumference 334 contacting the motor shaft 120 fitted in the shaft hole 332, and an outer circumference 336 facing the permanent magnets 320 inserted into the rotor body 310.

The thickness t of the sleeve 330 between the inner and outer circumferences 334 and 336 may range from 1.0 mm to 3.0 mm. When the thickness t is greater than 3.0 mm, leakage of magnetic flux from the rotor cores 340 to the sleeve 330 increases, thereby degrading the performance of the motor. On the other hand, when the thickness t is smaller than 1.0 mm, there may be a structural problem in that the sleeve 330 may be deformed when the motor shaft 120 is forcibly fitted into the shaft hole 332.

The rotor cores 340 support the permanent magnets 320 while establishing magnetic paths for magnetic flux generated from the permanent magnets 320. The rotor cores 340 are arranged in the circumferential direction of the rotor 300 while being spaced apart from one another, to form rotor slots 350 to receive the permanent magnets 320.

The rotor cores 340 may be connected to the sleeve 330 via bridges 360, respectively. The bridges 360 are arranged in the circumferential direction of the rotor 300 while corresponding to respective rotor cores 340. At least one bridge 360 outwardly extends from the outer circumference 336 of the sleeve 330 in the radial direction, to be connected to the inner end of the corresponding rotor core 340.

At least one bridge 360 may have a width W1 of 1.0 mm or less. The width W1 of at least one bridge 360 has influence on the amount of magnetic flux leaking toward the sleeve 330 through the bridge 360. When the width W1 of at least one bridge 360 is reduced, an increase in magnetic resistance may occur, thereby reducing leakage of magnetic flux in accordance with an increase in magnetic resistance.

However, when the width W1 of at least one bridge 360, which is a structure to connect the corresponding rotor core 340 to the sleeve 330, is excessively reduced, the bridge 360 may be damaged or the rotor body 310 may be deformed during high-speed rotation of the rotor 300. Therefore, the width W1 of at least one bridge 360 may be 0.4 mm or more in order to secure a desired structural strength.

The permanent magnets 320 are received in respective rotor slots 350, at least one of which is defined between the adjacent two rotor cores 340. Since at least one permanent magnet 320 is arranged to be spaced apart from the sleeve 330, an inner space 370 (FIG. 5) is formed between the permanent magnet 320 and the sleeve 330. By virtue of the inner space 370, it may effectively suppress leakage of magnetic flux from the permanent magnet 320 toward the motor shaft 120 via the sleeve 330.

A plastic member 400 may fill the inner space 370 between at least one permanent magnet 320 and the sleeve 330. By virtue of the plastic member 400 filling the inner space 370, it may avoid movement of the corresponding permanent magnet 320 while achieving an enhancement in the structural strength and stability of the rotor 300.

The outer end 322 of at least one permanent magnet 320 is disposed more inwardly in the radial direction than the outer surfaces of the corresponding rotor cores 340. At least one rotor core 340 is provided, at the outer end thereof, with outer support protrusions 341 respectively extending toward the two rotor slots 350 disposed adjacent to the rotor core 340. Opposite edges of the outer end 322 of at least one permanent magnet 320 are supported by the outer support protrusions 341 extending form the two rotor cores 340 disposed adjacent to the permanent magnet 320, respectively.

Figure 3:
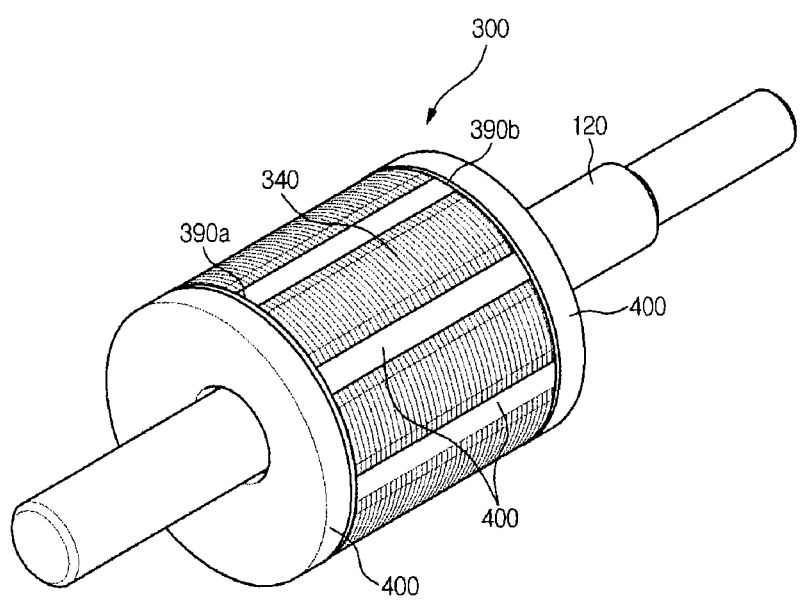
FIG. 3 is a perspective view illustrating a rotor according to an illustrated embodiment of the present disclosure.

A space 352 (FIG. 5) is defined by the outer end 322 of at least one permanent magnet 320 and the two outer support protrusions 341 supporting the permanent magnet 320 while facing each other. As shown in FIGS. 3 and 5, the space 352 may be filled with a plastic member 400. The plastic member 400 filling the space 352 supports the outer end 322 of the permanent magnet 320, along with the facing outer support protrusions 341, thereby increasing the structural strength of the rotor 300. Thus, it may avoid deformation of the outer support protrusions 341 or separation of the permanent magnet 320 from the rotor slot 350 due to centrifugal force generated during high-speed rotation of the rotor 300.

Figure 6:
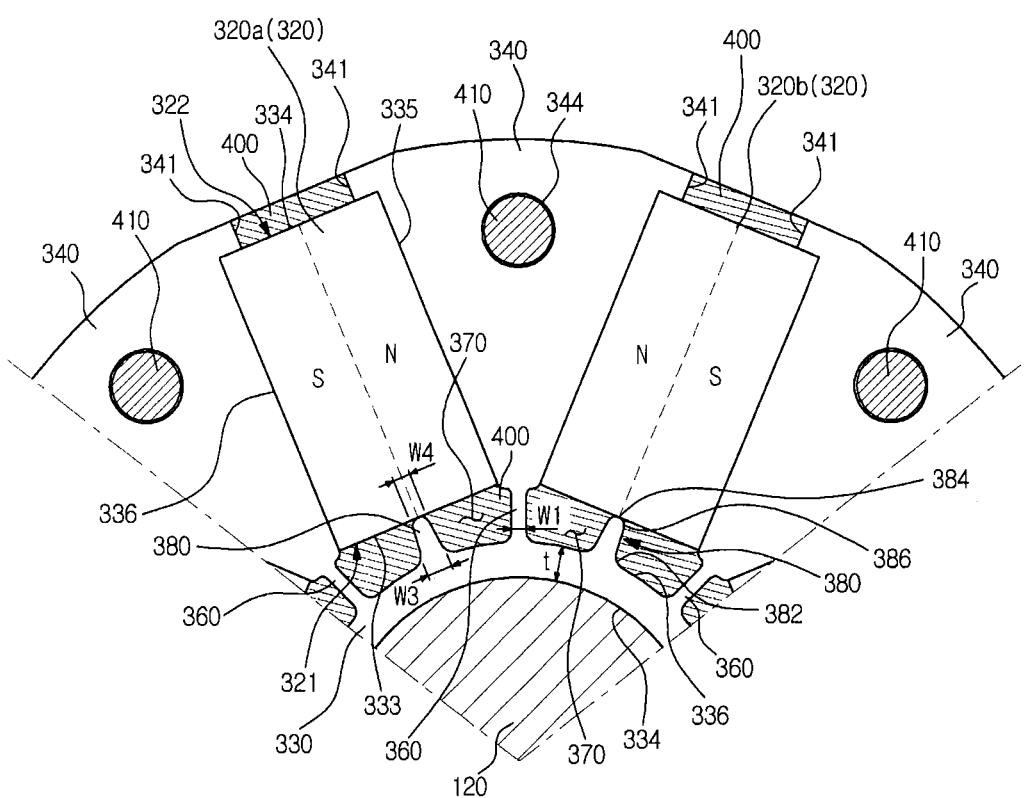
FIG. 6 is an enlarged view illustrating a portion of the rotor according to an illustrated embodiment of the present disclosure.

As shown in FIG. 6, the rotor body 310 includes inner support protrusions 380 to support the inner ends 321 of the permanent magnets 320, respectively, in order to space the permanent magnets 320 from the sleeve 330. The inner support protrusions 380 are arranged to correspond to respective permanent magnets 320. The inner support protrusions 380 extend outwardly from the outer circumference 336 of the sleeve 330 in the radial direction. The sleeve 330, rotor cores 340, bridges 360, and inner support protrusions 380 may be integrally formed using the same material, to constitute the rotor body 310.

At least one inner support protrusion 380 is arranged between the bridges 360 disposed adjacent to each other in the circumferential direction of the rotor 300. In this case, the inner support protrusion 380 is spaced apart from the adjacent bridges 360. The inner support protrusions 380 are formed to be separated from the bridges 360.

When the structure to support the permanent magnets is integrated with the bridges, the width of the bridges increases, thereby causing an increase in leakage of magnetic flux toward the motor shaft. However, when the inner support protrusions 380 are formed separately from the bridges 360, as shown in FIG. 6, it may reduce the width of the bridges 360, and thus to reduce leakage of magnetic flux.

When at least one inner support protrusion 380 is disposed near the corresponding bridges 360, leakage of magnetic flux toward the sleeve 330 via the inner support protrusion 380 is increased, even though the inner support protrusion 380 is separate from the bridges 360. To this end, at least one inner support protrusion 380 may be centrally disposed in the corresponding inner space 370 in the circumferential direction of the rotor 300 such that the inner support protrusion 380 is spaced apart from the two bridges 360 disposed adjacent thereto as far as possible. Also, at least one bridge 360 may be centrally disposed between the adjacent two inner support protrusions 380.

At least one inner support protrusion 380 may be arranged to support a central portion of the inner end 321 of the corresponding permanent magnet 320. Then, it may stably support the permanent magnet 320 in the case in which the inner end of the permanent magnet 320 is supported by one support protrusion. The central portion of the inner end 321 of the permanent magnet 320 corresponds to a region where the N and S poles of the permanent magnet 320 meet. When the inner support protrusion 380 supports the above-described region, it may reduce leakage of magnetic flux through the inner support protrusion 380.

At least one inner support protrusion 380 includes a connecting portion 382 connected to the sleeve 330, and a contact portion 384 contacting the corresponding permanent magnet 320.

In at least one inner support protrusion 380, the width W3 of the connecting portion 382 may be greater than the width W4 of the contact portion 394. The connecting portion 382 of at least one inner support protrusion 380 should have a width greater than a minimum width capable of providing a desired structural strength to the inner support protrusion 380. Although the contact portion 384 of at least one inner support protrusion 380 may have a further increased width in terms of stable support for the corresponding permanent magnet 320, adverse affects may be exhibited due to the increased width during magnetization of the permanent magnet 320.

At least one permanent magnet 320 is magnetized after being inserted into the corresponding rotor slot 350 in a non-magnetized state. In this case, when the width W4 of the contact portion contacting the corresponding permanent magnet 320 is excessively great, the magnetic field to magnetize the permanent magnet 320 may leak through the inner support protrusion 380. As a result, unstable magnetization of the permanent magnet 320 may be exhibited in the vicinity of the contact portion 384.

To this end, the width W4 of the contact portion 384 of at least one inner support protrusion 380 may be minimized to the extent that the permanent magnet 320 is stably maintained. The contact portion 384 of at least one inner support protrusion 380 may be formed with a round surface 386 in order to reduce the contact area of the contact portion 384 contacting the corresponding permanent magnet 320.

Figure 7:
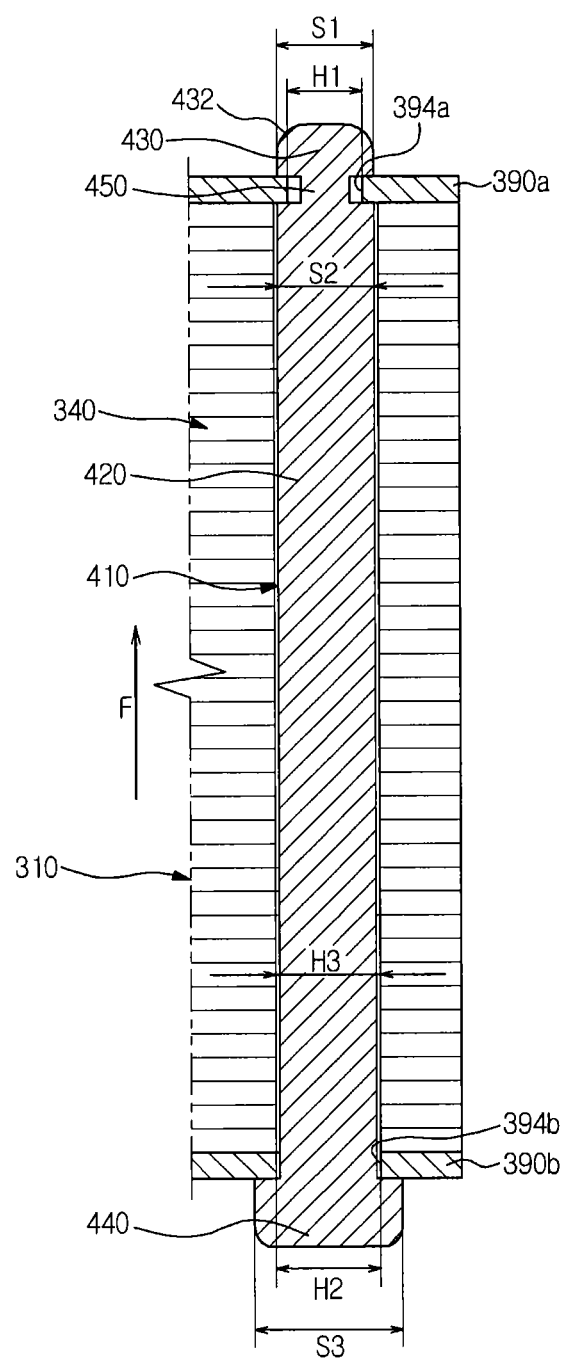
FIG. 7 is a sectional view illustrating a portion of the rotor according to an illustrated embodiment of the present disclosure and an embodiment of a fastening member used in the rotor.

As shown in FIGS. 4, 6, and 7, the rotor body 310 and the first and second cover plates 390a and 390b are coupled by fastening members 410. The rotor body 310 includes through holes 344 axially extending through the rotor cores 340. One or more of the rotor cores 340 may be provided with the through holes 344, respectively. FIGS. 1 to 7 illustrate an example in which the through holes 344 are formed to correspond to respective rotor cores 340.

The first and second cover plates 390a and 390b may be formed with plate holes 394a and 394b corresponding to the through holes 344 formed through the rotor cores 340, respectively. Hereinafter, the plate holes 394a of the first cover plate 390a will be referred to as "first plate holes", and the plate holes 394b of the second cover plate 390b will be referred to as "second plate holes".

The first and second cover plates 390a and 390b may be integrated with the rotor body 310 by disposing the first and second cover plates 390a and 390b at opposite sides of the rotor body 310, respectively, and then inserting the fastening members 410 through the second plate holes 394b, through holes 344, and first plate holes 394a. Thus, the structural strength of the rotor 300 may be increased.

As shown in FIGS. 4 and 7, the fastening members 410 are inserted into the rotor 300 in a direction F. The second cover plate 390b, rotor body 310, and first cover plate 390a are arranged in this order in the insertion direction of the fastening members 410, namely, the direction F.

At least one fastening member 410 includes a body 420, a first head 430, and a second head 440. The body 420, first head 430, and second head 440 may be integrally formed into a single member.

When at least one fastening member 410 is coupled with the rotor body 310, the body 420 thereof is inserted into the through hole 344 of the corresponding rotor core 340 after passing through the second cover plate 390b. The first head 430 is provided at a leading end of the body 420 in the insertion direction of the body 420 into the corresponding rotor core 430, namely, the direction F, such that the first head 430 may be coupled with the first cover plate 390a. When at least one fastening member 410 is inserted into the rotor 300, the first head 430 thereof is supported by an outer surface of the first cover plate 390a after passing through the corresponding first plate hole 394a. In accordance with the above-described coupling structure, it may omit the process of pressing the end of the fastening member 410 by a hammer, to fix the fastening member 410. Thus, it may prevent the rotor 300 from being deformed by impact applied thereto during a finishing process for the end of the fastening member 410.

In at least one fastening member 410, the cross-sectional size S1 of the first head 430 is greater than the size H1 of the first plate hole 394a. Accordingly, the first head 430 may pass through the first plate hole 394a through a force fitting process. The first head 430 has an engagement surface. The engagement surface is supported by the outer surface of the first cover plate 390a around the first plate hole 394a after passing through the first plate hole 394a.

A guide surface 432 may be formed at an outer surface of the first head 430 in order to allow the first head 430 to be smoothly inserted into the first plate hole 394a, which has a smaller cross-sectional size than the first head 430. The guide surface 432 is formed to have a cross-sectional size gradually increasing in a direction from a leading end of the first head 430 to a trailing end of the first head 430, namely, a direction opposite to the direction F. The guide surface 432 may have a curved surface shape or an inclined surface shape.

The first head 430 passes through the second cover plate 390b and rotor core 340 before being coupled to the first cover plate 390a. The cross-sectional size S1 of the first head 430 may be smaller than the size H2 of the second plate hole 394b and the size H3 of the through hole 344 in order to allow the first head 430 to smoothly pass the second plate hole 394b and through hole 344. Similarly, the cross-sectional size S2 of the body 420 of the fastening member 410 may be smaller than the size H2 of the second plate hole 394b and the size H3 of the through hole 344 in order to allow the body 420 to smoothly pass through the second plate hole 394b and through hole 344.

Thus, at least one fastening member 410 is fixed to the first cover plate 390a in a simple and convenient manner in accordance with a force fitting process after being smoothly inserted into the second cover plate 390b and rotor body 310. Accordingly, it may prevent excessive impact from being applied to the rotor 300 during the process of fixing the fastening member 410 to the rotor 300, and thus to prevent the rotor 300 from being deformed during the assembly process thereof. Also, an enhancement in productivity is achieved because the fastening member 410 may be simply and conveniently assembled without using a separate component to fix the fastening member 410 to the rotor 300.

In order to prevent the body 420 of at least one fastening member 410 from passing through the first cover plate 390a, the cross-sectional size S2 of the body 420 may be greater than the size H1 of the first plate hole 394a. The body 420 is supported by an inner surface of the first cover plate 390a. Accordingly, it may avoid axial movement of the fastening members 410.

At least one fastening member 410 may also include a neck 450 between the first head 430 and the body 420. At least a portion of the neck 450 is received in the first plate hole 394a. The neck 450 has a smaller cross-sectional size than the cross-sectional size S1 of the first head 430 and the cross-sectional size S2 of the body 420.

The second head 440 is disposed at a trailing end of the body 420 in the insertion direction of the body 420 into the rotor core 340, namely, the direction F, while being supported by an outer surface of the second cover plate 390b. The cross-sectional size S3 of the second head 440 is greater than the size H2 of the second plate hole 394b.

When the cross-sections of the body 420, first head 430, second head 440, first plate hole 394, through hole 344, and second plate hole 394b are circular, the above-described "cross-sectional size" means "diameter".

Figure 8:
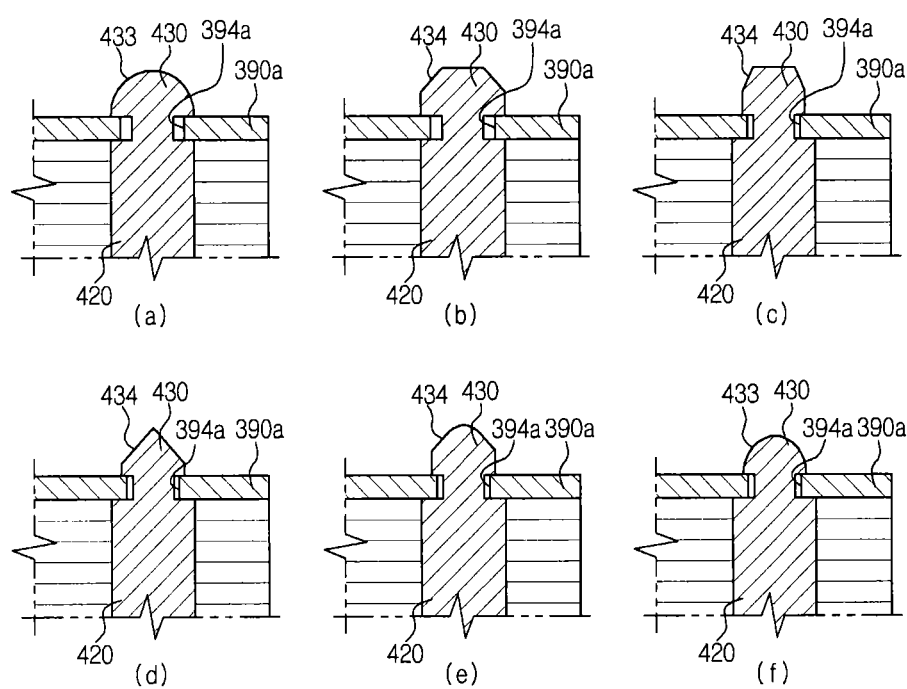
FIG. 8 is a sectional view illustrating various embodiments of the fastening member used in the rotor according to an illustrated embodiment of the present disclosure.

As shown in FIG. 8, the first head 430 may have various shapes. As shown in FIGS. 8(a) and 8(f), the first head 430 may have a leading end surface 433 formed to be curved as a whole. Also, as shown in FIGS. 8(b) to 8(e), the first head 430 may have an inclined surface 434 having a cross-sectional size gradually increasing as the inclined surface 434 extends rearwards from a leading end thereof. Meanwhile, as shown in FIGS. 8(c) to 8(f), the first head 430 may have a maximum cross-sectional size greater than the size of the first plate hole 394a, but smaller than the cross-sectional size of the body 420.

Figure 9:
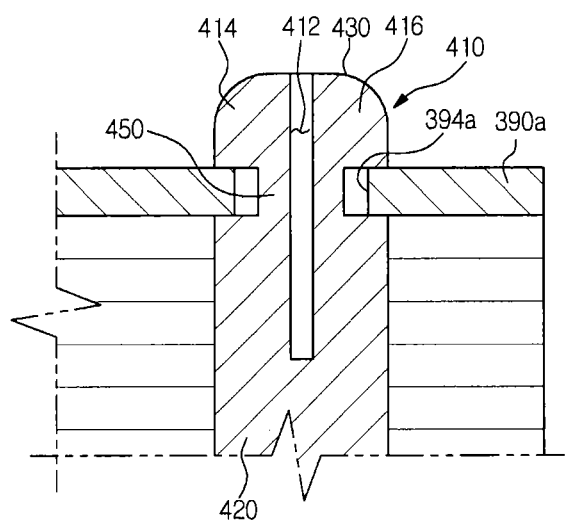
FIG. 9 is a sectional view illustrating another embodiment of the fastening member used in the rotor according to an illustrated embodiment of the present disclosure.

As shown in FIG. 9, at least one fastening member 410 may also include a slit 412 extending from the first head toward the body 420 in a longitudinal direction of the fastening member 410. The leading end of the fastening member 410 has a first portion 414 and a second portion 416, which are spaced apart from each other by the slit 412.

When the first head 430 is inserted into the corresponding plate hole 394a of the first cover plate 390a, the first and second portions 414 and 416 of the leading end of the fastening member 410 may be elastically deformed to reduce the cross-sectional size of the first head 430. Accordingly, the first head 430 may more smoothly pass through the first plate hole 394a. When the neck 450 is fitted in the first plate hole 394a as the first head 430 passes through the first plate hole 394a, the first and second portions 414 and 416 of the fastening member 410 are elastically returned to their original states. Thus, the first head 430 is supported by the outer surface of the first cover plate 390a.

Figure 10:
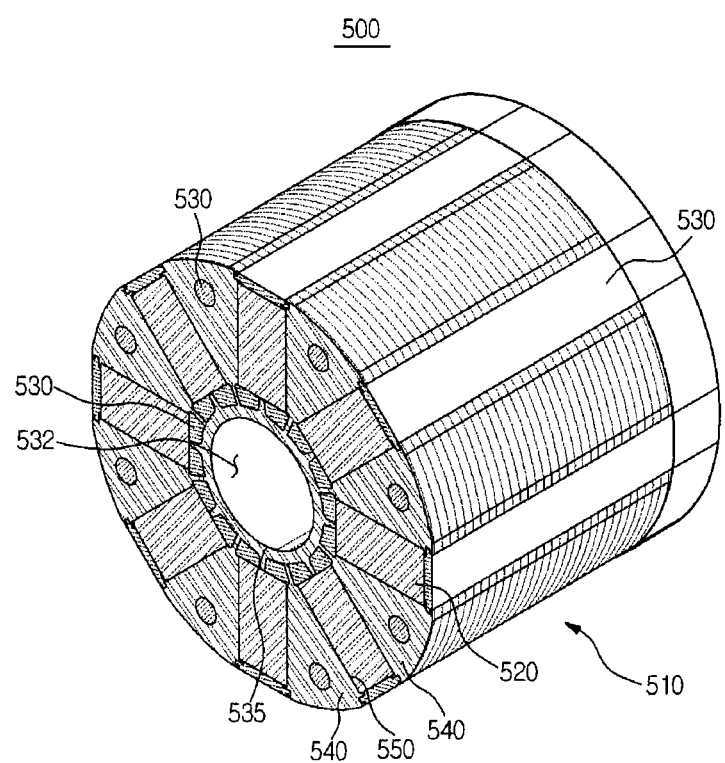
FIG. 10 is a sectioned perspective view illustrating a rotor according to another embodiment of the present disclosure.
Figure 11:
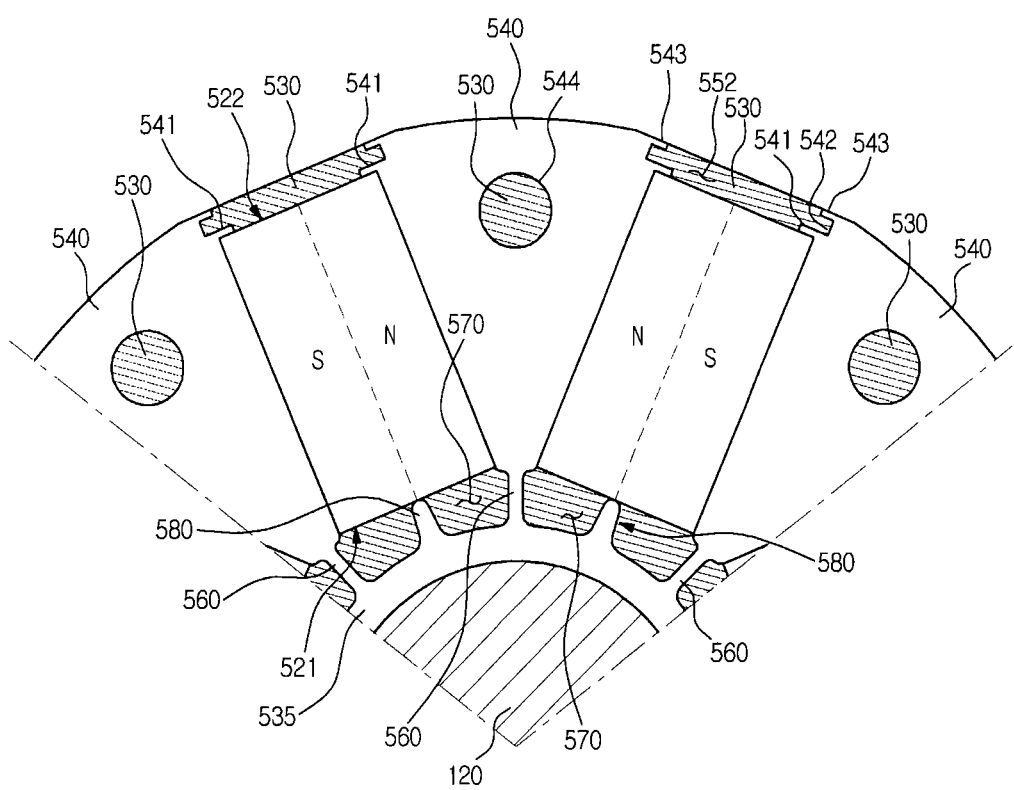
FIG. 11 is an enlarged sectional view illustrating a portion of the rotor shown in FIG. 10.

FIGS. 10 and 11 illustrate a rotor according to another embodiment of the present disclosure. As shown in FIGS. 10 and 11, the rotor, which is designated by reference numeral "500", includes a rotor body 510, permanent magnets 520 inserted into the rotor body 510, a plastic member 530 filling spaces or holes formed at the rotor body 510.

The rotor body 510 includes a sleeve 535 and rotor cores 540. The sleeve 535 has an annular structure. The sleeve 535 has a shaft hole 532 to be coupled with the motor shaft 120. The rotor cores 540 are connected to the sleeve 535 via bridges 560, respectively. The rotor cores 540 are arranged to be spaced apart from one another in a circumferential direction of the rotor 500, to define rotor slots 550. A through hole 544 is formed through at least one rotor core 540.

At least one permanent magnet 520 is inserted into a corresponding one of the rotor slots 550 such that an inner end 521 is spaced apart from the sleeve 535. Thus, an inner space 570 is defined between the permanent magnet 520 and the sleeve 535. The inner end 521 of the permanent magnet 520 is supported by an inner support protrusion 580. The inner support protrusion 580 is protruded from the sleeve 535 toward the rotor slot 550 while being arranged between the corresponding bridges 560 disposed adjacent to each other in the circumferential direction of the rotor 500.

At least one permanent magnet 520 is supported, at an outer end 522 thereof, by outer support protrusions 541. The outer support protrusions 541 extend from the adjacent rotor cores 340 defining the corresponding rotor slot 550 toward the rotor slot 550 such that the outer support protrusions 541 cover opposite edges of the outer end 522 of the permanent magnet 520, respectively.

The plastic member 530 may be integrated with the rotor body 510 by inserting the rotor body 510 into a mold (not shown) in a state in which the permanent magnets 520 are coupled to the rotor body 510, and performing an injection molding process for the mold. The injection-molded plastic member 530 may fill the inner space 570 between one or more permanent magnet 520 and the sleeve 535 and the through hole 544 of at least one rotor core 540. The plastic member 530 may also be provided to cover the outer end 522 of at least one permanent magnet 520 in the radial direction of the rotor 500.

The outer end 522 of at least one permanent magnet 520 is disposed more inwardly in the radial direction of the rotor 500 than the outer surfaces of the corresponding rotor cores 540. A plastic receiving space 552 is defined by the two rotor cores adjacent to each other in the circumferential direction of the rotor 500 and the outer end 522 of the permanent magnet 520 disposed between the adjacent two rotor cores 540.

At least one rotor core 540 includes fixing protrusions 543 extending toward the corresponding plastic receiving space 552 to form a fixing groove 542 between the fixing protrusion 543 and a corresponding one of the outer support protrusions 541. The plastic member 530, which is received in the plastic receiving space 552, partially fills the fixing groove 542. The plastic member 530, which fills the fixing groove 542, is supported by the fixing protrusion 543 disposed outside the filled plastic member 530. Thus, it may prevent the plastic member 530 from being separated from the plastic receiving space 552 due to centrifugal force during high-speed rotation of the rotor 500. As shown in FIG. 11, the fixing protrusion 543 may be spaced apart from the corresponding outer support protrusion 541 in the radial direction of the rotor 500.

Figure 12:
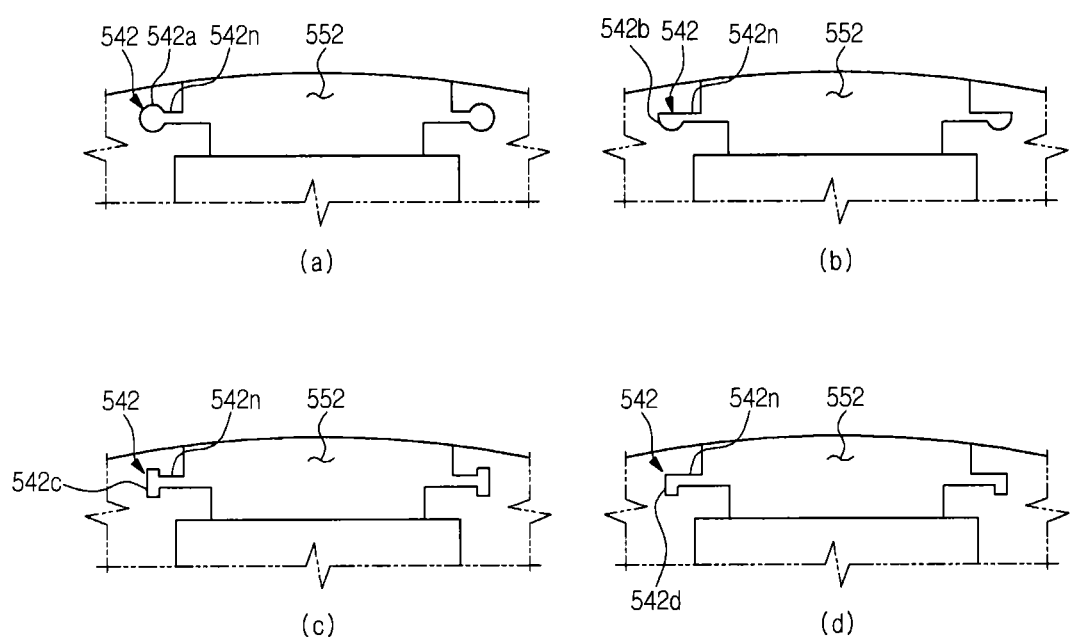
FIG. 12 is a view illustrating various embodiments of a structure to fix a plastic member in the rotor according to an embodiment of the present disclosure shown in FIG. 10.

As shown in FIG. 12, the fixing groove 542 may have various shapes. The fixing groove 542 may include a connecting portion 542n communicating with the corresponding plastic receiving space 552, and an enlarged portion 542a, 542b, 542c or 542d enlarged to receive an increased amount of the plastic member. The enlarged portion 542a, 542b, 542c or 542d may be enlarged toward opposite sides in the radial direction of the rotor 500, as shown in FIG. 12(a) or 12(c), or may be enlarged toward one side in the radial direction of the rotor 500, as shown in FIGS. 12(b) and 12(d). The enlarged portion 542a, 542b, 542c or 542d may have various shapes such as circular, semicircular, and rectangular shapes.

Figure 13:
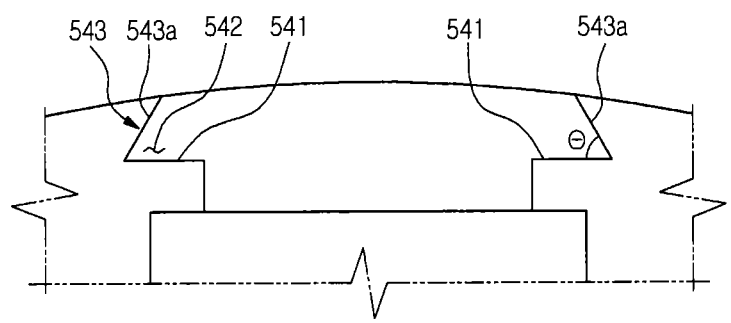
FIG. 13 is a view illustrating another embodiment of the structure to fix the plastic member in the rotor according to an embodiment of the present disclosure shown in FIG. 10.

As shown in FIG. 13, at least one fixing protrusion 543 may include an inclined portion 543a inclinedly extending from the corresponding outer support protrusion 541. The inclined portion 543a is formed to gradually reduce the width of the corresponding plastic receiving space 552 in the circumferential direction of the rotor 500 as the inclined portion 543a outwardly extends in the radial direction of the rotor 500. The fixing groove 542, which corresponds to the fixing protrusion 543, is formed between the inclined portion 543a of the fixing protrusion 543 and the outer support protrusion 541. The plastic member, which fills the fixing groove 542, is supported by the inclined portion 543a. Accordingly, it may suppress separation of the plastic member due to centrifugal force.

The angle θ of the inclined surface 543a of at least one fixing protrusion 543 with respect to the corresponding outer support protrusion 541 may range from approximately 40° to 70°. When the angle θ is greater than 70°, the effect of the inclined portion 543a to support the plastic member 530 is reduced. On the other hand, when the angle θ is less than 40°, it may be difficult to completely fill the fixing groove 542 with a plastic material. In this case, design of an injection mold may also be difficult.

Figure 14:
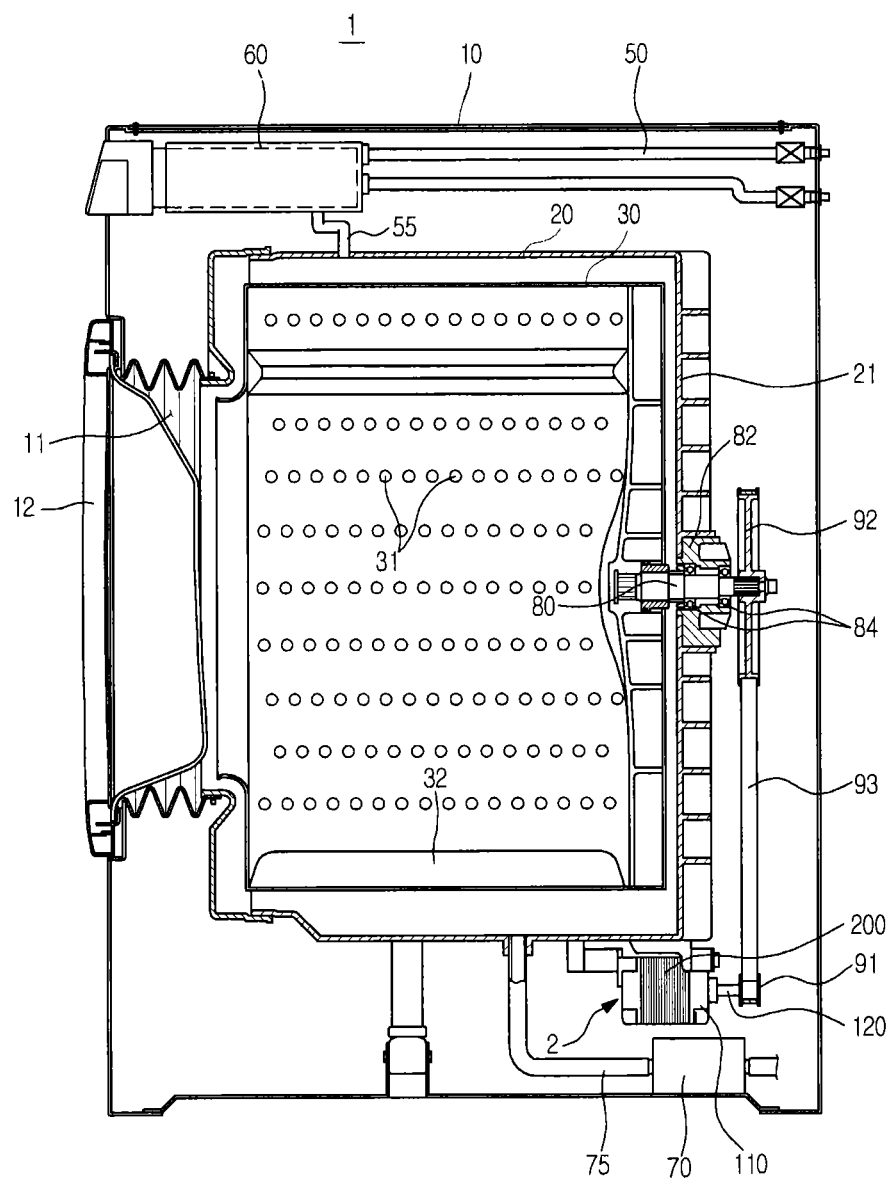
FIG. 14 is a view illustrating a washing machine, to which the motor according to an illustrated embodiment of the present disclosure is applied.

FIG. 14 is a view illustrating a configuration of a washing machine according to an embodiment of the present disclosure.

As shown in FIG. 14, the washing machine, which is designated by reference numeral "1", includes a cabinet 10 to form an outer appearance of the washing machine, a tub 20 disposed within the cabinet 10, to store water, a drum 30 rotatably disposed within the tub 20, and a drive motor 2 to drive the drum 30.

A loading opening 11 is formed at a front wall of the cabinet 10, to allow loading of laundry. The loading opening 11 is opened or closed by a door 12 installed at the front wall of the cabinet 10.

A water supply tube 50 is installed over the tub 20, to supply washing water to the tub 20. The water supply tube 50 is connected, at one side thereof, to an external water supply source (not shown). The water supply tube 50 is also connected, at the other side thereof, to a detergent supplier 60. The detergent supplier 60 is connected to the tub 20 via a connecting tube 55. Water supplied through the water supply tube 50 is supplied to the interior of the tub 20, along with a detergent, via the detergent supplier 60.

A drainage pump 70 and a drainage tube 75 are installed beneath the tub 20, to drain water from the interior of the tub 20.

A plurality of through holes 31 are formed through a peripheral wall of the drum 30, for flow of washing water. Lifters 32 are installed on an inner surface of the peripheral wall of the drum 30, to allow tumbling of laundry during rotation of the drum 30.

A drive shaft 80 is coupled to the drum 30. The drive shaft 80 is rotatably supported by the tub 20. One end of the drive shaft 80 extends outwardly of the tub 20 after passing through a rear wall 21 of the tub 20.

A bearing housing 82 is installed at the rear wall 21 of the tub 20, to rotatably support the drive shaft 80. The bearing housing 82 may be made of an aluminum alloy. When the tub 20 is injection-molded, the bearing housing 82 may be inserted into the rear wall 21 of the tub 20. A bearing 84 is installed between the bearing housing 82 and the drive shaft 80, to allow the drive shaft 80 to rotate smoothly.

The drive motor 2 is mounted on a bottom wall of the tub 20. The drive motor 2 includes a motor housing 110, a stator 200 fixed to the motor housing 110, and a rotor (not shown) disposed within the stator 200. The drive motor 2 may include a stator and a rotor, which are selected from those described with reference to FIGS. 1 to 13.

A motor pulley 91 is mounted at an end of the motor shaft 120 extending outwardly of the motor housing 110. A drum pulley 92 is mounted to the drive shaft 80 connected to the drum 30. The motor pulley 91 and drum pulley 92 may be connected by a belt 93. The motor pulley 91, drum pulley 92, and belt 93 constitute a power transmission to transmit drive force from the motor 100 to the drive shaft 80 of the drum 30.

Although the washing machine has been described, as an example, with reference to FIG. 14, matters described in FIGS. 1 to 13 may be applied not only to various home electronic appliances such as a washing machine, a clothes drying machine, and an air conditioner, but also to an electric vehicle, which requires a miniaturized high-power motor.

As apparent from the above description, in accordance with embodiments of the present disclosure, it may achieve an enhancement in the durability of a motor through increase of the structural strength of a rotor, and to prevent the rotor from being deformed or damaged during high-speed rotation thereof.

It may also achieve an enhancement in the performance of the motor through reduction of leakage of magnetic flux toward a motor shaft, and a reduction in motor size for the same output power.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A motor comprising:
   a stator comprising stator cores and coils wound around the stator cores;
   a rotor to co-operate with the stator in an electromagnetic manner such that the rotor rotates; and
   a motor shaft coupled to the rotor, to rotate along with the rotor,
   wherein the rotor comprises:
   a sleeve having a shaft hole, through which the motor shaft extends;
   a plurality of rotor cores arranged to be spaced apart from one another in a circumferential direction of the rotor, at least one of the rotor cores having a through hole;
   at least one of permanent magnets disposed between adjacent ones of the rotor cores such that the permanent magnets are arranged in a radial manner about the sleeve;
   first and second cover plates disposed at opposite sides of the permanent magnets in an axial direction, the first and second cover plates having a plurality of plate holes respectively corresponding to the through holes of the rotor cores; and
   at least one of fastening members coupled to a corresponding one of the rotor cores and the first and second cover plates, at least one of the fastening members comprising a body inserted into the through hole of the corresponding rotor core, and a first head provided at a leading end of the body in an insertion direction of the body into the rotor core, the first head being supported by an outer surface of the first cover plate after passing through a corresponding one of the plate holes of the first cover plate when the fastening member is coupled to the rotor.

2. The motor according to claim 1, wherein the first head of the fastening member has a cross-sectional size greater than a size of the plate hole of the first cover plate such that the first head forcibly passes through the plate hole of the first cover plate.

3. The motor according to claim 1, wherein the first head of the fastening member has a cross-sectional size smaller than a size of the through hole of the rotor core such that the first head smoothly passes through the through hole of the rotor core.

4. The motor according to claim 1, wherein the body of the fastening member has a cross-sectional size smaller than a size of the through hole of the rotor core such that the body smoothly passes through the through hole of the rotor core.

5. The motor according to claim 4, wherein the cross-sectional size of the body of the fastening member is greater than a size of the plate hole of the first cover plate such that the body is prevented from passing through the plate hole of the first cover plate.

6. The motor according to claim 1, wherein the fastening member further comprises a neck provided between the first head and the body, to be received in the plate hole of the first cover plate.

7. The motor according to claim 1, wherein the plate hole of the second cover plate has a size greater than a cross-sectional size of the first head of the fastening member and a cross-sectional size of the body of the fastening member such that the first head and the body pass through the plate hole of the second cover plate when the body is inserted into the rotor core.

8. The motor according to claim 1, wherein the fastening member further comprises a second head provided at a trailing end of the body in the insertion direction of the body into the rotor core, and supported by an outer surface of the second cover plate.

9. The motor according to claim 1, wherein the first head has a guide surface formed to have a cross-sectional size gradually increasing in a direction from a leading end of the first head to a trailing end of the first head.

10. The motor according to claim 1, wherein the fastening member further comprises a slit formed in a longitudinal direction of the fastening member such that the first head is deformed when the first head passes through the plate hole of the first cover plate, to reduce a cross-sectional size of the first head.

11. The motor according to claim 8, wherein the first head, the body and the second head of the fastening member are integrated to form a single member.

12. The motor according to claim 1, wherein the rotor further comprises an injection-molded plastic member to cover outsides of the first and second cover plates.

13. The motor according to claim 1, wherein the rotor further comprises an injection-molded plastic member to cover outer ends of the permanent magnets in a radial direction of the rotor.

14. The motor according to claim 13, wherein:
the outer end of at least one of the permanent magnets is disposed more inwardly in the radial direction than outer surfaces of the rotor cores disposed adjacent to each other in the circumferential direction of the rotor at opposite sides of the permanent magnet; and
the rotor further comprises a plastic receiving space defined by the adjacent rotor cores and the outer end of the permanent magnet disposed between the adjacent rotor cores.

15. The motor according to claim 14, wherein at least one of the rotor cores comprises a first protrusion extending to support the outer end of the permanent magnet disposed adjacent to the rotor cores, and a second protrusion extending toward the plastic receiving space, to define a groove between the first protrusion and the second protrusion.

16. The motor according to claim 15, wherein the second protrusion has an inclined portion inclinedly extending from the first protrusion such that the plastic receiving portion has a width in the circumferential direction of the rotor such that the width is gradually reduced as the plastic receiving portion outwardly extends in the radial direction of the rotor.

17. The motor according to claim 16, wherein the inclined portion of the second protrusion forms an angle ranging approximately from 40° to 70° with respect to the first protrusion.

18. The motor according to claim 15, wherein the second protrusion is disposed outside the first protrusion in the radial direction of the rotor while being spaced apart from the first protrusion such that the groove is arranged between the first protrusion and the second protrusion.

19. A rotor of a motor, the rotor being disposed within a stator of the motor, comprising:
a sleeve formed with a shaft hole to be coupled with a motor shaft;
a plurality of rotor cores arranged to be spaced apart from one another in a circumferential direction of the rotor, to define a plurality of rotor slots, one or more of the rotor cores having through holes, respectively;
a plurality of bridges arranged to connect the rotor cores to the sleeve, respectively;
a plurality of permanent magnets respectively inserted into the rotor slots such that at least one of the permanent magnets has an inner end spaced apart from the sleeve;
a plurality of inner support protrusions extending from the sleeve toward the rotor slots, to support the inner ends of the permanent magnets, respectively;
a plurality of outer support protrusions extending from the rotor cores, to support the outer ends of the permanent magnets, respectively;
an injection-molded plastic member filling the rotor slots, to cover the outer ends of the permanent magnets;
a plurality of fixing grooves provided at the rotor cores, respectively, to receive the injection-molded plastic member; and
a plurality of fixing protrusions arranged outside the fixing grooves in a radial direction of the rotor, respectively, to prevent the injection-molded plastic member from being separated from the rotor by centrifugal force during rotation of the rotor.

20. The rotor according to claim 19, wherein at least one of the fixing protrusions inclinedly extends from a corresponding one of the outer support protrusions such that the injection-molded plastic member has a width extending in the radial direction of the rotor while being gradually reduced as the injection-molded plastic member outwardly extends in the radial direction of the rotor.

21. The rotor according to claim 19, wherein at least one of the fixing protrusions is spaced apart from a corresponding one of the outer support protrusions such that a corresponding one of the fixing grooves is arranged between the fixing protrusion and the outer support protrusion.

22. The rotor according to claim 19, further comprising:
first and second cover plates disposed at opposite sides of the permanent magnets in an axial direction, the first and second cover plates having plate holes respectively corresponding to the through holes of the rotor cores, and
at least one of fastening members coupled to a corresponding one of the rotor cores and the first and second cover plates, at least one of the fastening members comprising a body inserted into the through hole of the corresponding rotor core, and a head provided at a leading end of the body in an insertion direction of the body into the rotor core, the head being supported by an outer surface of the first cover plate after passing through a corresponding one of the plate holes of the first cover plate when the fastening member is coupled to the rotor.

23. The motor according to claim 6, wherein a cross-sectional size of the neck is smaller than a cross-sectional size of the first head and a cross-sectional size of body.

24. The motor according to claim 8, wherein a cross-sectional size of the second head is greater than a cross-sectional size of the plate hole of the second cover plate.

25. The rotor according to claim 19, wherein the inner support protrusions are formed separately from the bridges.

26. A rotor of a motor, the rotor being disposed within a stator of the motor, comprising:

a sleeve having a shaft hole, through which the motor shaft extends;

a plurality of rotor cores arranged to be spaced apart from one another in a circumferential direction of the rotor, at least one of the rotor cores having a through hole;

at least one of permanent magnets disposed between adjacent ones of the rotor cores such that the permanent magnets are arranged in a radial manner about the sleeve;

first and second cover plates disposed at opposite sides of the permanent magnets in an axial direction, the first and second cover plates having a plurality of plate holes respectively corresponding to the through holes of the rotor cores; and at least one of fastening members coupled to a corresponding one of the rotor cores and the first and second cover plates, the fastening members comprising a body inserted into the through hole of the corresponding rotor core, and a first head provided at a leading end of the body in an insertion direction of the body into the rotor core, the first head being supported by an outer surface of the first cover plate after passing through a corresponding one of the plate holes of the first cover plate when the fastening member is coupled to the rotor.

* * * * *